Oct. 18, 1927.
G. B. WHEELER
1,645,676
STROPPING HOLDER FOR SAFETY RAZOR BLADES
Filed May 13, 1927
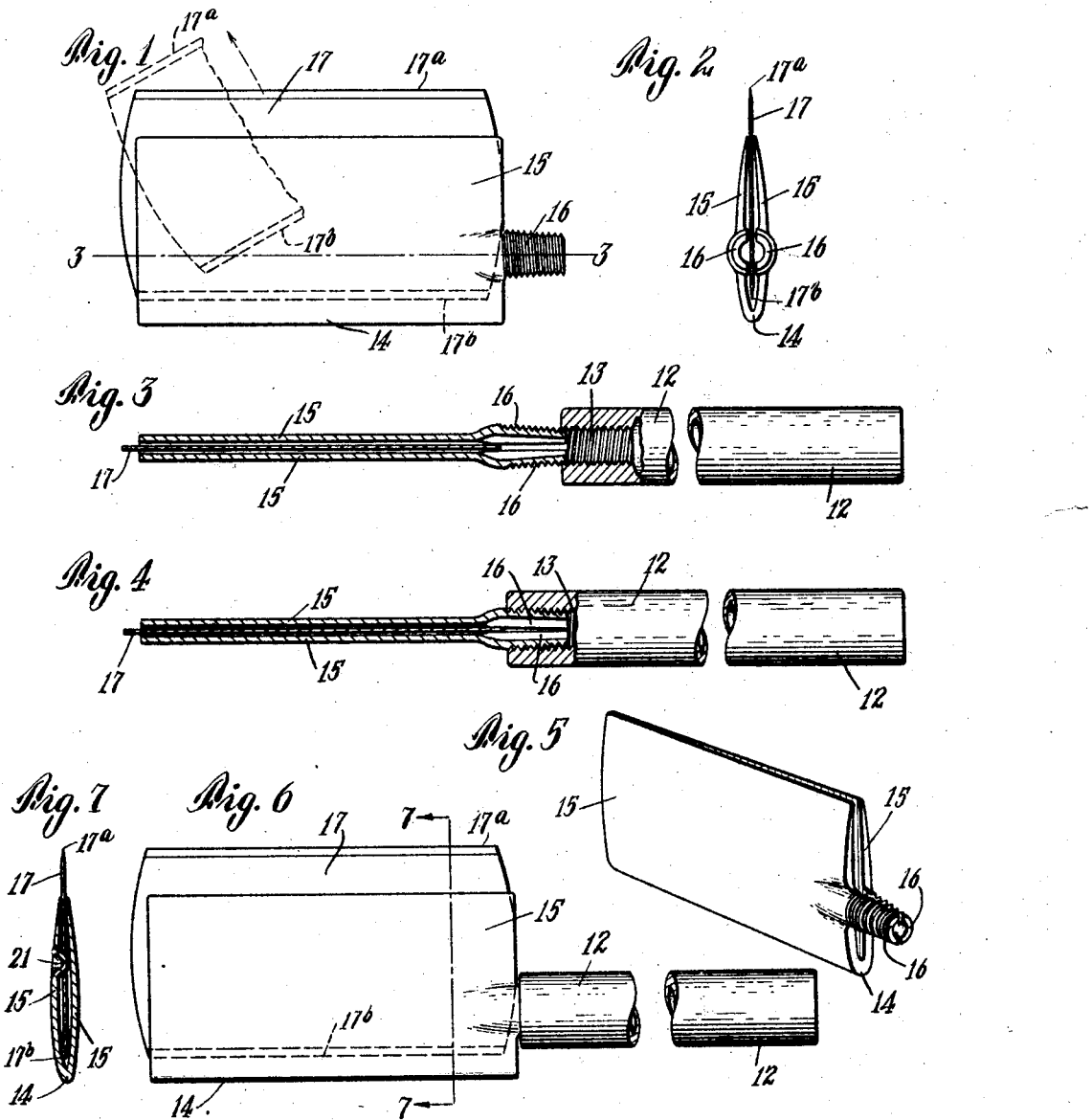
Inventor:
Grace B. Wheeler.
by Wright Brown Quinby Mays
Attys.

Patented Oct. 18, 1927.

1,645,676

UNITED STATES PATENT OFFICE.

GRACE B. WHEELER, OF BOSTON, MASSACHUSETTS.

STROPPING HOLDER FOR SAFETY-RAZOR BLADES.

Application filed May 13, 1927. Serial No. 191,063.

This invention is embodied in a stropping-holder for a safety-razor blade, comprising a blade gripper and a handle therefor, separably engaged with the gripper and constituting the handle of the razor with which the blade is used, the construction being such that the operation of coupling the handle to the gripper causes the latter to firmly grip the blade.

The object is to provide a simple, inexpensive and effective stropping holder, enabling the owner of a safety-razor to utilize the handle of the razor as an element of the holder by coupling thereto a blade gripper of such small size that it may be stored with the handle and other parts of the razor in the box usually provided for the storage of the razor, so that a very compact stropping-holder is provided, at a slight expense.

Of the accompanying drawings forming a part of this specification,—

Figure 1 is a side view, showing a blade-gripper embodying the invention, and a blade loosely inserted therein.

Figure 2 is an end view of the gripper and blade, as shown by Figure 1.

Figure 3 shows the gripper and blade in section on line 3—3 of Figure 1, and a safety-razor handle partially engaged with the gripper.

Figure 4 is a view similar to Figure 3, showing the handle fully engaged with the gripper.

Figure 5 is a perspective view of the gripper.

Figure 6 is a side view, showing the gripper and handle engaged as in Figure 4.

Figure 7 is a section on line 7—7 of Figure 6.

The drawing shows the parts enlarged to about twice their actual size.

The same reference characters indicate the same parts in all of the figures.

In the drawings, 12 designates a safety-razor handle, having in one end the usual tapped orifice 13, adapted to engage an externally threaded stud or post on an element, not shown, of a safety-razor.

The gripper includes a neck 14, forming the inner longitudinal edge of the gripper, a pair of jaws 15, connected by the neck and projecting side by side therefrom, the jaws having opposed blade-gripping edges parallel with the neck, and a longitudinally divided tapered externally screw-threaded shank integral with the jaws and projecting from the inner ends thereof.

The shank is composed of two externally semi-cylindrical tapered sections 16, 16, independent of each other, the one formed on one jaw, and the other on the other jaw, the sections being spaced from the neck 14 and collectively forming a tapered shank of gradually decreasing diameter from the jaws to the outer end of the shank. Each section is provided with screw-threaded portions complemental to the screw-thread portions on the other section, the two sections collectively constituting a tapered screw-threaded shank which is compressible, the sections being normally spaced apart by the jaws, as shown by Figures 2 and 5.

When the blade 17 is inserted between, and is engaged loosely with the inner sides of the gripping edges of the jaws, the shank is expanded and its smaller end is adapted to engage the internal thread at the outer end of the handle orifice 13, as shown by Figure 3. When the handle is turned to screw it upon the shank, the latter is compressed, as shown by Figure 4, and tensions the jaws, so that their gripping edges are pressed against the sides of the blade. Owing to the fact that the shank is at one end of the gripper, the tensioning of the jaws is greater at the inner ends from which the shank projects, than at the outer ends, so that, if the gripping edges were normally parallel, the grip at their outer ends would be weaker than at their inner ends adjacent to the shank, because of the resilience of the jaws. To prevent this variation and facilitate the insertion of the blade between the jaws, I arrange the gripping edges so that they are normally non-parallel and spaced apart at their inner ends adjacent to the shank, and converge and contact with each other at their outer ends, as shown by Figure 5.

It will now be seen that when the blade is moved endwise between the jaws, its leading end being inserted in the space between the inner ends and pushed toward the outer ends, the outer end portions are forced apart and initially tensioned by the blade, before the final tensioning of the jaws by the compression of the shank, so that when the handle is applied to the shank and compresses it, the jaws are uniformly tensioned from end to end by the initial and final tensioning, and exert a uniform grip on the blade, preventing liability of a swinging displacement of the blade.

The normal convergence of the jaw edges toward their inner ends enables said inner ends to remain in gripping engagement with the outer end portion of the blade after the handle is removed and the inner ends of the jaw edges sprung apart. The outer end portion of the blade is therefore pinched between the outer ends of the jaw edges, so that said ends constitute, in effect, a pivotal connection between the gripper and the outer end portion of the blade, permitting the reversal of a blade having two cutting edges 17ª and 17ᵇ by first swinging it outward, as indicated by dotted lines in Figure 1, until its cutting edge 17ᵇ is withdrawn from between the jaws, and then moving it endwise toward the inner ends of the gripper until the edge 17ᵇ becomes the edge which is exposed for stropping. The reversing operation may be performed without separating the blade from the gripper, and requires less time than would be required if the blade were first entirely removed from the gripper, then reversed, and then again inserted.

The location of the shank between the neck 14 and the gripping edges of the jaws enables the shank, when compressed, to more effectively tension the gripping edge portions than would be the case if the shank were located substantially in alinement with the neck, and provides a recess between the jaws extending from the gripping edges to the neck, the latter being at the opposite side of the shank from the gripping edges. The depth of the recess is therefore sufficient to enable the inner edge of a double-edged blade to be adequately spaced from the neck and out of contact therewith, the shank being located in sufficiently close proximity to the gripping edges.

The gripper may be made by bending a metal blank which is relatively thick at the midlength portion from which the neck 14 and the shank sections 16 are formed, and bevelled from said portion to its gripping edges, so that said edges are thin, and the outer sides of the jaws adjacent said edges are so inclined that the blade may be presented at a desirable angle to a strop.

The gripper may be provided with projections 21, for engagement with the usual holes in a safety-razor blade.

I claim:

For use with a handle having a tapped socket in one end, a blade gripper composed of a resilient neck, resilient jaws connected by the neck and extending side by side therefrom, the jaws having thin outer edges parallel with the neck, shank sections integral with the jaws and projecting from the inner ends thereof, said sections being normally spaced yieldingly apart by the jaws, and provided with semi-cylindrical longitudinally tapered external surfaces, each having screw-thread portions, the sections collectively constituting an externally tapered screw-threaded compressible shank, adapted to be compressed by the operation of screwing the handle on to the shank, and thereby press the jaws inwardly against the sides of an interposed blade, the outer edges of the jaws being normally spaced apart at their inner ends, and converging therefrom to their outer ends which normally contact with each other, so that a blade may be freely inserted between the inner ends and caused to separate the outer ends, before the engagement of the handle with the shank, the arrangement being such that when the handle is screwed upon the shank, the outer edges of the jaws are pressed against the blades and firmly grip the same, the convergence of said edges to their outer ends causing a grip of uniform force from end to end of the blade, the outer end portion of the blade being gripped only by the outer ends of the jaw edges when the handle is removed, so that said ends constitute a pivot on which a two-edged blade may be swung between the jaws to reverse its position, and locate another edge in position to be stropped, without separating the blade from the gripper.

In testimony whereof I have affixed my signature.

GRACE B. WHEELER.